United States Patent
Jeon et al.

(10) Patent No.: US 11,149,655 B2
(45) Date of Patent: Oct. 19, 2021

(54) HIGH PRESSURE FUEL PUMP AND LPDI SYSTEM WITH THE SAME

(71) Applicant: MOTONIC CORPORATION, Seoul (KR)

(72) Inventors: Wan Jae Jeon, Daegu (KR); Yong Deok Park, Daegu (KR); Dae Yong Kim, Daegu (KR); Dong Sub Kim, Daegu (KR)

(73) Assignee: MOTONIC CORPORATION, Seoul (KR)

( * ) Notice: Subject to any disclaimer, the term of this patent is extended or adjusted under 35 U.S.C. 154(b) by 0 days.

(21) Appl. No.: 16/989,433

(22) Filed: Aug. 10, 2020

(65) Prior Publication Data

US 2021/0079853 A1  Mar. 18, 2021

(30) Foreign Application Priority Data

Sep. 17, 2019 (KR) .................. 10-2019-0114135

(51) Int. Cl.
   *F02D 1/00* (2006.01)
   *F02M 59/20* (2006.01)
   (Continued)

(52) U.S. Cl.
   CPC .............. *F02D 1/00* (2013.01); *F02D 41/38* (2013.01); *F02M 55/02* (2013.01);
   (Continued)

(58) Field of Classification Search
   CPC ...... F02D 1/00; F02D 41/38; F02D 2041/389; F02D 41/3082; F02D 19/022; F02M 59/20; F02M 55/02; F02M 59/025; F02M 59/02; F02M 55/04; F02M 21/0245; F02M 59/46; F02M 59/366; F02M 21/0242; F02M 59/102; F02M 59/44
   See application file for complete search history.

(56) References Cited

U.S. PATENT DOCUMENTS

| | | | |
|---|---|---|---|
| 6,047,671 A * | 4/2000 | Tubb | F02M 65/008 123/73 AD |
| 2011/0197858 A1* | 8/2011 | Nonaka | F02M 57/02 123/472 |
| 2019/0186440 A1* | 6/2019 | Perfetto | F02M 21/0287 |

FOREIGN PATENT DOCUMENTS

| | | |
|---|---|---|
| JP | 1994-211057 A | 8/1994 |
| KR | 10-2009-0119977 A | 11/2009 |

(Continued)

*Primary Examiner* — Sizo B Vilakazi
(74) *Attorney, Agent, or Firm* — Novick, Kim & Lee, PLLC; Jae Youn Kim

(57) ABSTRACT

Disclosed are a high pressure fuel pump and a liquid petroleum direct injection system including the same. The high pressure fuel pump includes a body having an intake port and an exhaust port, and provided therein with a pressing device configured to press a portion of fuel at a high pressure, a spill valve coupled to one side of the body to control a supply flow rate and exhaust pressure of the fuel, and a cover coupled to an upper portion of the body and having a recovery port for recovering a portion of the fuel to a bombe. The cover has a dome shape that is convex upward. The cover collects gaseous fuel generated by heat of an engine when the engine is turned off after driving, that is, collects vapor to recover the vapor to the bombe, thereby improving the restartability.

7 Claims, 7 Drawing Sheets

(51) Int. Cl.
  *F02M 55/02* (2006.01)
  *F02D 41/38* (2006.01)
  *F02M 59/02* (2006.01)

(52) U.S. Cl.
  CPC .......... *F02M 59/025* (2013.01); *F02M 59/20* (2013.01); *F02D 2041/389* (2013.01)

(56) References Cited

FOREIGN PATENT DOCUMENTS

| | | |
|---|---|---|
| KR | 10-2014-0106764 A | 9/2014 |
| KR | 10-1975824 B1 | 5/2019 |
| KR | 10-1987458 B1 | 6/2019 |

* cited by examiner

HIGH PRESSURE FUEL PUMP AND LPDI SYSTEM WITH THE SAME

CROSS-REFERENCE TO RELATED APPLICATION

This application claims priority to and the benefit of Korean Patent Application No. 10-2019-0114135, filed on Sep. 17, 2019, the disclosure of which is incorporated herein by reference in its entirety.

BACKGROUND ART

1. Field of the Invention

The present invention relates to a liquid petroleum direct injection (LPDI) system, and more particularly, to a high pressure fuel pump for driving an engine by discharging liquid fuel stored in a bombe at high pressure and injecting the liquid fuel into a cylinder, and an LPDI system including the same.

2. Description of the Related Art

In general, unlike a mechanical LPG fuel system that relies on pressure of a fuel tank, a liquid petroleum direct injection (LPDI) system installs a high pressure fuel pump on a fuel supply line and drives an engine by injecting liquid fuel, which is discharged at high pressure by the high pressure fuel pump, into a cylinder using an injector.

The LPDI system has the effects of improving power performance of a vehicle, improving fuel efficiency by reducing fuel consumption, and reducing an amount of carbon emission.

For example, the applicant of the present invention has disclosed and filed patent applications for an LPDI system and configuration of a high pressure fuel pump applied thereto as shown in Patent Documents 1 to 3 below.

Since the LPDI system uses LPG fuel, vaporization and compression of the LPG fuel may occur in the process of using the LPG fuel due to the property of the LPG fuel. This phenomenon is called 'vapor rock'.

The vapor rock phenomenon is known to occur because liquid and gaseous fuels coexist on a fuel line due to residual heat of an engine compartment when the engine is turned off after driving.

Thus, the vapor rock phenomenon occurring in the LPDI system of the related art may become a cause of deterioration of startability at the next start after the vehicle has been driven and turned off.

The vapor rock phenomenon may occur at various positions of a fuel supply system, and the vapor rock phenomenon occurring at the high pressure portion may cause a problem.

In particular, the vapor rock phenomenon occurring in a closed space such as a high pressure fuel pump and a delivery pipe is not easy to solve due to the characteristics of high pressure devices, and thus it is difficult to improve startability.

For example, when the vapor rock phenomenon occurs in the high pressure fuel pump applied to the LPDI system of the related art, liquid and gaseous fuels coexist at an upper end of the high pressure fuel pump.

That is, according to the high pressure fuel pump of the related art, a cover is formed in a planar shape by reducing a volume for fuel circulation and pulsation reduction such that the volume is optimized at the time of fuel return, so the vapor inside the cover is not completely eliminated at the time of restarting and fuel circulation, but partially remains inside the cover.

In addition, the high pressure fuel pump according to the related art has a problem in that main components may be worn during driving due to low lubrication caused by the characteristics of the LPG fuel.

RELATED DOCUMENTS

Patent Document (Patent Document 1) Korean Patent Registration No. 10-1975824 (issued on Apr. 30, 2019)
(Patent Document 2) Korean Patent Registration No. 10-1987458 (issued on Jun. 3, 2019)
(Patent Document 3) Korean Unexamined Patent Publication No. 10-2014-0106764 (published on Sep. 4, 2014)

SUMMARY OF THE INVENTION

In order to solve the problems occurring in the related art, an object of the present invention is to provide a high pressure fuel pump and a liquid petroleum direct injection (LPDI) system including the same, capable of improving startability at the time of restarting by collecting vapor generated due to heat of an engine after driving a vehicle.

Another object of the present invention is to provide a high pressure fuel pump and an LPDI system including the same, capable of preventing components from being worn caused by the characteristics of LPG fuel.

In order to achieve the objects as described above, the present invention provides a high pressure fuel pump including: a body formed at a lateral side thereof with an intake port and an exhaust port, and provided therein with a pressing device configured to press a portion of fuel, which is supplied through the intake port, at a high pressure; a spill valve coupled to one side of the body to control a supply flow rate and exhaust pressure of the fuel; and a cover coupled to an upper portion of the body and having a recovery port for recovering a portion of the fuel supplied into the body to a bombe, wherein the cover collects gaseous fuel vaporized by heat of an engine when the engine is turned off after driving, and has a dome shape which is convex upward to recover the gaseous fuel to the bombe when the engine is restarted.

Further, in order to achieve the objects as described above, a liquid petroleum direct injection system including the high pressure fuel pump according to the present invention includes: a fuel pump configured to pump the fuel stored in the bombe to supply the fuel toward the engine; the high pressure fuel pump configured to receive the fuel supplied from the fuel pump through the intake port formed in the body, press a portion of the fuel at high pressure in a high pressure portion formed inside the body, and transfer the fuel that remains after the fuel is pressurized to a fuel recovery line through the recovery port communicating with the low pressure portion such that the remaining fuel is recovered to the bombe; a delivery pipe connected to the exhaust port of the high pressure fuel pump through which the pressurized fuel is exhausted and filled with the pressurized fuel; an injector configured to directly inject the fuel filled in the delivery pipe into a combustion chamber of an engine; an electronic control unit configured to generate control signals for controlling a motor in the fuel pump, the injector, and a valve of the high pressure fuel pump based on a target rpm of the engine; and a motor controller configured to control a driving of the motor in accordance with the control signal, wherein the cover of the high pressure fuel pump collects gaseous fuel vaporized by heat of the engine when the engine is turned off after driving, and has a dome shape which is convex upward to recover the gaseous fuel to the bombe when the engine is restarted.

As described above, according to the high pressure fuel pump and the LPDI system including the same of the present invention, a cover is formed in a convex dome shape so that gaseous fuel can be collected in an inside of the cover, and the collected gaseous fuel can be returned to a bombe at the time of restarting an engine.

Thus, according to the present invention, restartability can be improved by collecting gaseous fuel, that is, vaporized fuel generated due to heat of an engine when the engine is turned off after driving, and delivering the vaporized fuel into a bombe upon restarting.

In addition, according to the present invention, when a damper portion is provided at an upper portion of a body, a portion of an upper surface of a cover is formed as an inclined surface to collect gaseous fuel, which is vaporized by heat of an engine inside the cover, and the collected gaseous fuel is recovered to a bombe when the engine is restarted so that vapor inside the high pressure fuel pump can be easily eliminated.

Further, according to the present invention, it is possible to prevent main components from being worn upon driving of a high pressure fuel pump due to low lubrication caused by the characteristics of LPG fuel.

DETAILED DESCRIPTION OF THE INVENTION

Figure 1:
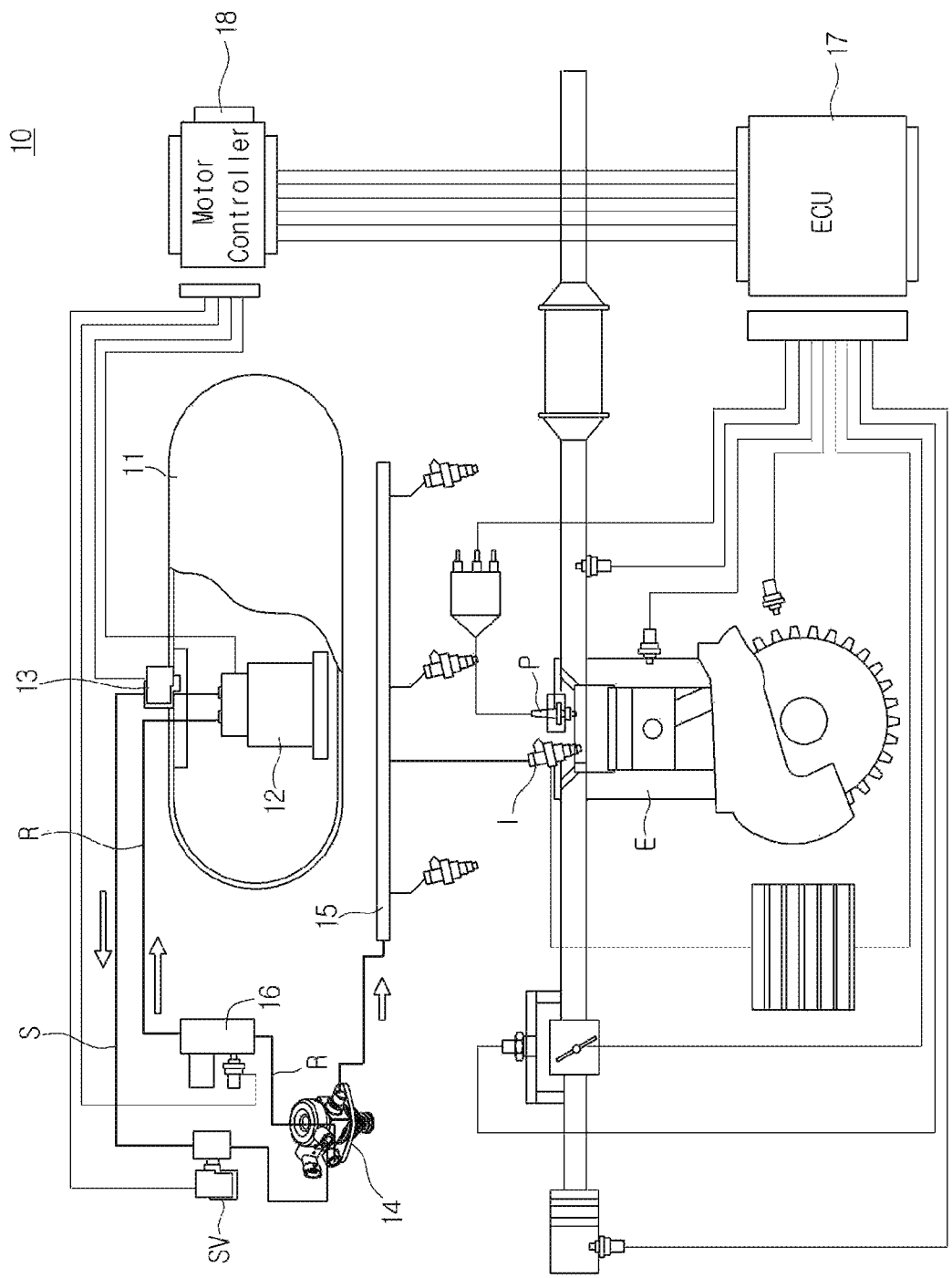
FIG. 1 is a block diagram showing a configuration of an LPDI system including a high pressure fuel pump according to an exemplary embodiment of the present invention.

Hereinafter, a high pressure fuel pump and a liquid petroleum direct injection (LPDI) system including the same according to an exemplary embodiment of the present invention will be described in detail with reference to the accompanying drawings.

In the following description, the terms indicating directions such as 'left', 'right', 'front', 'backward', 'upward' and 'downward' are defined as indicating respective directions based on the state shown in the drawings.

First, the configuration of the LPDI system including the high pressure fuel pump according to the exemplary embodiment of the present invention will be described with reference to FIG. 1.

FIG. 1 is a block diagram showing the configuration of an LPDI system including the high pressure fuel pump according to an exemplary embodiment of the present invention.

In the present embodiment, fuel supplied through a fuel supply line S by the pumping operation of a fuel pump 12 at the start of an engine is initially delivered to a high pressure fuel pump 14 at a constant pressure, for example, a pressure of 45 bar, and the fuel pressure supplied at the initial stage of the start is called a 'low pressure'.

In addition, a transfer path for transferring low pressure LPG fuel from an intake port of the high pressure fuel pump 14 to a fuel recovery line R through a recovery port is referred to as a 'low pressure portion 202 (see FIG. 3)'.

As shown in FIG. 1, the LPDI system 10 according to the exemplary embodiment of the present invention may include a bombe 11 in which the fuel is stored, the fuel pump 12 installed in the bombe 11 to pump the fuel, the fuel supply line S for supplying the fuel pumped from the fuel pump 12 to an engine E, the high pressure fuel pump 14 for pressurizing the fuel pumped by the fuel pump 12 to a high pressure, a fuel recovery line R for recovering a portion of the fuel supplied to the high pressure fuel pump 14 from the low pressure portion 202 of the high pressure fuel pump 14 to the bombe 11, a delivery pipe 15 in which the fuel pressurized by the high pressure fuel pump 14 is filled at a high pressure, an injector I for directly injecting the fuel, which is filled in the delivery pipe 15 at a high pressure, to a combustion chamber of the engine E, an electronic control unit (17, hereinafter referred to as ECU) for generating control signals to control the driving of a motor inside the fuel pump 12 and the injector I based on the target RPM of the engine E, and a motor controller 18 for controlling the driving of the motor according to the control signal of the ECU 17.

A shut-off valve, which is opened or closed according to the driving signal of the motor controller 18 based on the control signal of the ECU 17 to shut off the fuel supplied from the bombe 11, may be installed at a front end of the high pressure fuel pump 14 of the fuel supply line S and a fuel pressure regulator 16, which reduces the pressure of the fuel recovered from the low pressure portion 202 of the high pressure fuel pump 14 to the bombe 11, may be installed at a rear end of the high pressure fuel pump 14 of the fuel recovery line R.

The fuel pump 12 pumps the LPG fuel stored in the bombe 11 to supply the fuel to the fuel supply line S. In this case, the fuel supplied through the fuel supply line S is initially delivered to the high pressure fuel pump 14 in a low pressure state, for example, a pressure of about 45 bar.

The high pressure fuel pump 14 may pressurize a portion of the fuel, which is pumped by the fuel pump 12 and supplied through the fuel supply line S at a low pressure, such that a portion of the fuel has a high pressure, for example, about 40 bar to 150 bar. Then, the high pressure fuel pump 14 may supply a portion of the fuel to the delivery pipe 15 and recover the remaining fuel from the low pressure portion 202 to the bombe 11 through the fuel recovery line R.

Meanwhile, first and second pressure sensors (not shown) may be installed at a front end of the high pressure fuel pump 14 of the fuel supply line S and a rear end of the high pressure fuel pump 14 of the fuel recovery line R, respectively, to detect the pressure of the fuel that is moved, and a third pressure sensor (not shown) may be installed on the delivery pipe 15.

Thus, the ECU 17 may generate the control signals to allow the motor controller 18 to control the driving of the shut-off valve SV, the fuel pump 12, a multi-valve 13 and the fuel pressure regulator 16 according to the fuel pressure detected from the first and second pressure sensors and the third pressure sensor installed on the delivery pipe 15.

In addition, the LPDI system 10 including the high pressure fuel pump according to the exemplary embodiment of the present invention may further include a cut-off valve (not shown).

The cut-off valve may open or close the fuel recovery line R according to the control signal of the ECU 17. For example, the cut-off valve may be configured as a solenoid valve. Such a cut-off valve may be operated to close the fuel recovery line R for a predetermined time if an ignition key is operated at the start of the engine. Therefore, the fuel recovered to the bombe 11 may be temporally cut-off by closing the cut-off valve during the start of the engine, so that the pressure of the fuel supplied to the high pressure fuel pump 14 through the fuel supply line S by the pumping operation of the fuel pump 12 can be increased, thereby compressing the vaporized fuel inside the fuel supply line S.

Accordingly, the high pressure fuel pump 14 may stably receive the fuel, and supply the fuel to the injector I through the delivery pipe 15 by pressurizing all of the supplied fuel to a predetermined high pressure.

Embodiment 1

Next, the configuration of the high pressure fuel pump according to a first embodiment of the present invention will be described in detail with reference to FIGS. 2 to 4.

Figure 2:
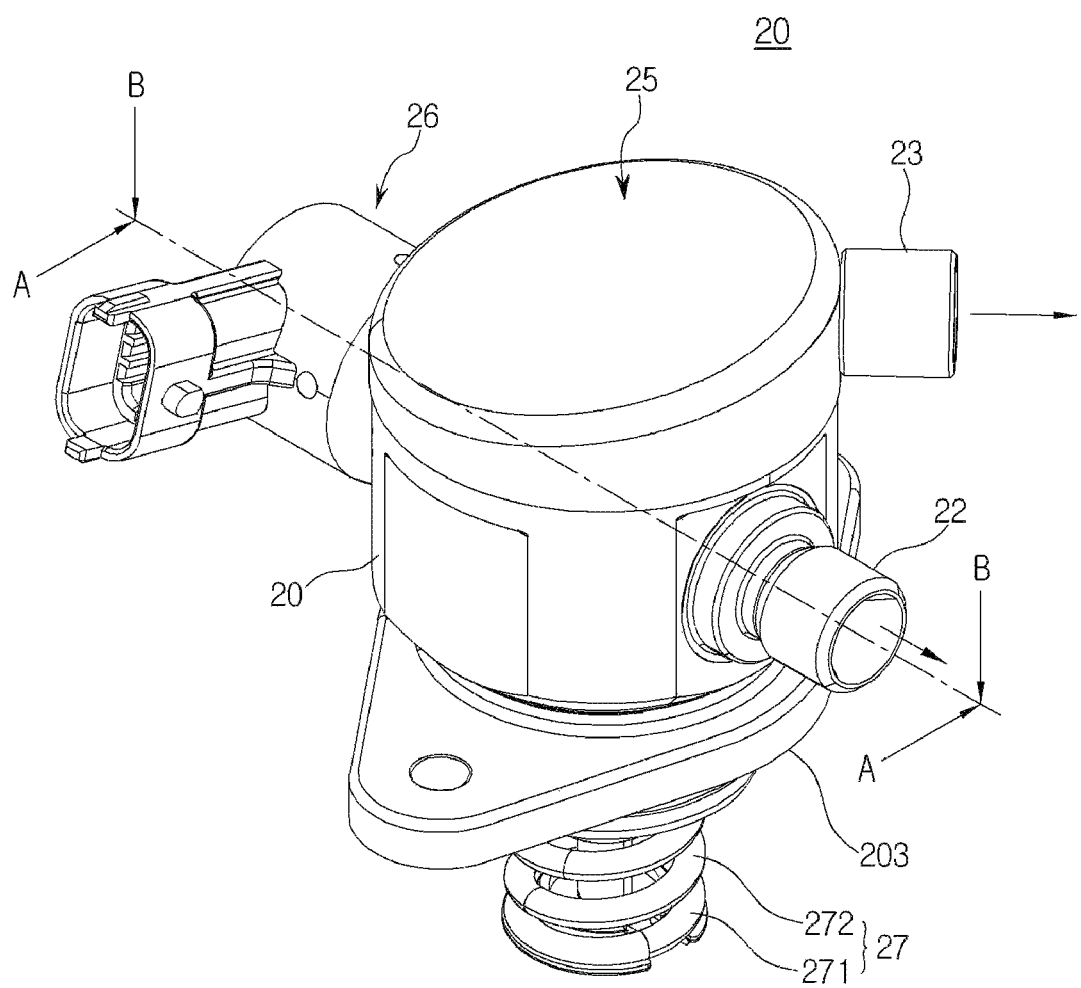
FIG. 2 is a perspective view showing a high pressure fuel pump according to a first embodiment of the present invention.
Figure 3:
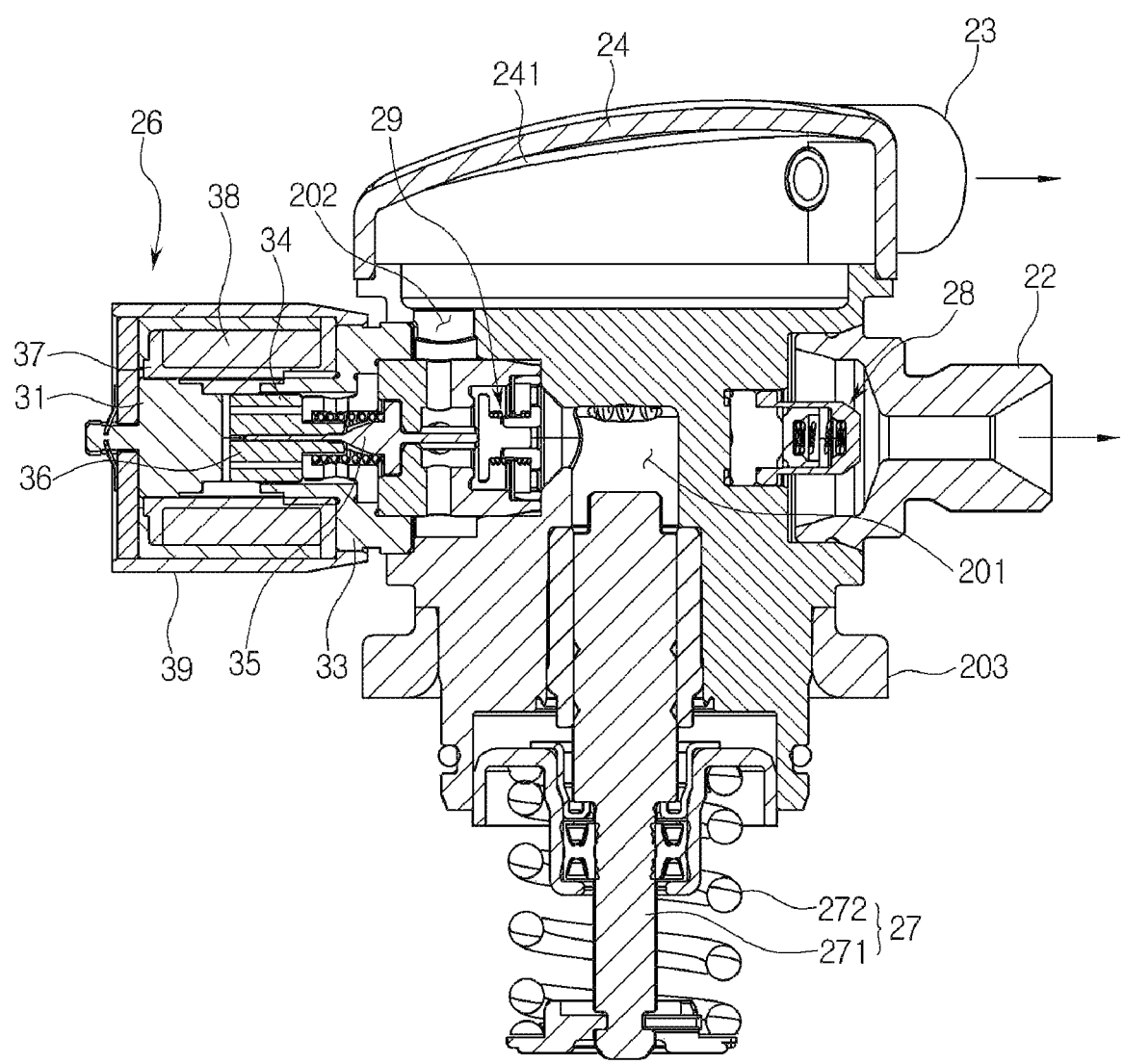
FIG. 3 is a sectional view taken along line A-A' of FIG. 2.
Figure 4:
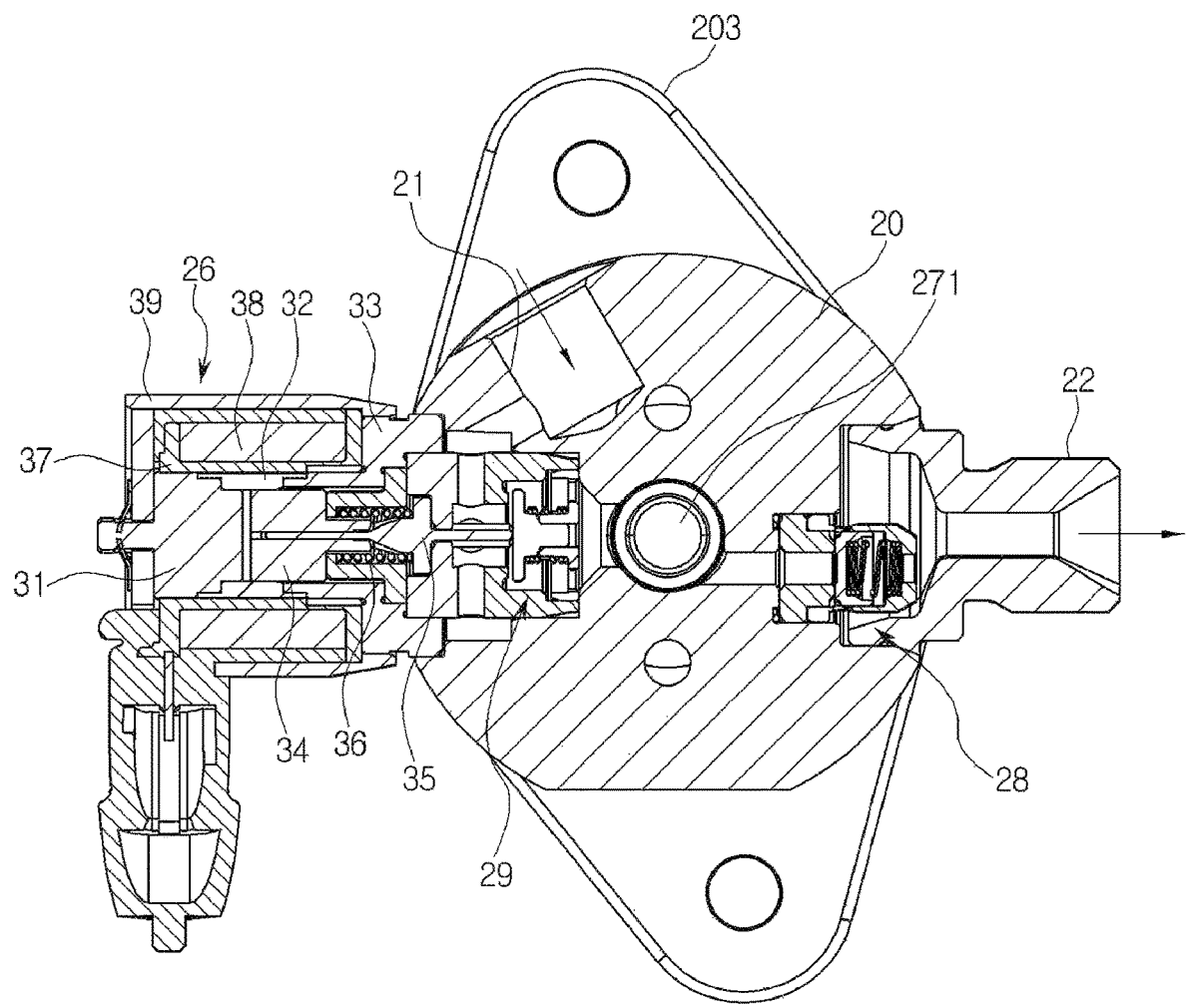
FIG. 4 is a sectional view taken along line B-B' of FIG. 2.

FIG. 2 is a perspective view showing a high pressure fuel pump according to a first embodiment of the present invention, FIG. 3 is a sectional view taken along line A-A' of FIG. 2, and FIG. 4 is a sectional view taken along line B-B' of FIG. 2.

As shown in FIGS. 2 to 4, the high pressure fuel pump 14 according to the first embodiment of the present invention may include a body 20 formed at a lateral side thereof with an intake port 21 and an exhaust port 22, and provided therein with a pressing device 27 configured to press a portion of fuel, which is supplied through the intake port 21, at a high pressure, a spill valve 26 coupled to one side of the body 20 to control a supply flow rate and exhaust pressure of the fuel, and a cover 24 coupled to an upper portion of the body 20 and having a recovery port 23 for recovering a portion of the fuel supplied into the body to a bombe 11.

In addition, the high pressure fuel pump 14 may further include a roller tappet (not shown) installed between the body 20 and a cam of an engine camshaft (not shown) to convert a rotational motion of the cam into a linear reciprocating motion and transmit the linear reciprocating motion to the pressing device 27.

A space in which the pressing device 27 is installed is formed may be formed at a lower portion of the body 20, and the intake port 21 and the exhaust port 22 may be formed at the lateral side of the body 20.

The fuel introduced into the body 20 through the intake port 21 may be transferred to the low pressure portion 202 provided at an upper portion and an inner portion of the body 20 and the recovery port 23 formed in the cover 24.

That is, the low pressure portion 202 may serve as a movement passage for the fuel, which is connected to a high pressure portion 201 through the intake port 21, the spill valve 26 and an upper space of the body 20, the inlet 21, the spill valve 26, and the upper space of the body 20, and the high pressure portion 201 may serve as a movement passage for the fuel, which connects an upper portion of the pressing device 27 to the exhaust port 22.

A bracket 203 may be coupled to an outer peripheral surface of the body 20 to fix the body 20 to a vehicle body.

The pressing device 27 may generate suction force and pressing force for the fuel in the body 20.

To this end, as shown in FIG. 3, the pressing device 27 may include a piston 271 connected to the camshaft of the engine via the roller tappet to move up and down and a return spring 272 coupled to the piston 271 to provide a restoring force.

As shown in FIG. 3, the pressing device 27 may constitute the high pressure portion 201 together with the body 20. The high pressure portion 201 may be a space in which a portion of the fuel is pressurized and may function as a movement passage through which the pressurized fuel moves. That is, the high pressure portion 201 may be formed on a passage through which a portion of the pressurized fuel introduced into the intake port 21 is supplied to the exhaust port 22, and may be formed at an upper portion of the piston 271 of the pressing device 27.

Meanwhile, when a portion of the fuel is vaporized in an inner space of the high pressure portion 201, a micro pipe (not shown) for discharging the vaporized fuel to the low pressure portion 202 may be formed between the high pressure portion 201 defined by the pressing device 27 and the body 20 and the low pressure portion 202 formed inside the body 20.

The cover 24 may be coupled to the upper portion of the body 20 to shield an upper surface of the body 20, and have a function of collecting the gaseous fuel, which is obtained as liquid-phase fuel is vaporized into gas-phase fuel by the heat of the engine when the engine is turned off after driving.

To this end, the cover 24 may have a dome shape which is convex upward such that a space for collecting the gaseous fuel is provided in the cover 24.

In detail, the upper surface of the cover 24 may be configured as an inclined surface inclined downward to the left in a direction opposite to the recovery port 23 when viewed from FIG. 3.

Therefore, the fuel vaporized by the heat of the engine, that is, the gaseous fuel may move to an upper portion of the liquid-phase fuel due to the difference in specific gravity. That is, the gaseous fuel may be collected in the upper portion of the inner space of the cover 24 along the inclined surface in the inner space of the cover 24, and may be recovered to the bombe 11 through the recovery port 23 when the engine is restarted.

As described above, according to the present invention, the cover has the dome shape which is convex upward so that the gaseous fuel inside the cover may be collected, and the collected gaseous fuel may be recovered to the bombe when the engine is restarted.

Therefore, according to the present invention, the vapor existing in the high pressure fuel pump may be collected and recovered to the bombe when the engine is turned off, thereby improving restartability.

Referring again to FIGS. 2 to 4, an exhaust-side check valve 28 coupled to the exhaust port 22 and an intake-side check valve 29 connected to the spill valve 26 to supply the fuel introduced into the body 20 to the exhaust-side check valve 28 while preventing the fuel from flowing back may be provided inside the body 20.

In addition, the intake port 21, the exhaust port 22, and the recovery port 23 may be provided with an exhaust opening, an intake opening, and a recovery opening, respectively.

The spill valve 26 may include a core 31 through which the magnetic flux flows, a sleeve 32 coupled to one side of the core 31, a casing 33 coupled to one side of the sleeve 32, a plunger 34 configured to reciprocate a needle 35 by power applied from an inside of the casing 33, and a spring 36 for providing restoring force to the needle 35.

A bobbin 37 may be installed at an outer portion of the core 31, a coil 38 may be wound around the bobbin 37, and a housing 39 may be coupled to an outer portion of the bobbin 37.

In the present embodiment, a coating layer coated with a coating material may be formed on an outer surface of the plunger 34, which performs the reciprocating motion, to prevent the plunger from being worn due to the characteristics of the LPG fuel having the low lubrication property.

Therefore, the present invention can prevent main components, especially the plunger from being worn due to the characteristics of the LPG fuel when the high pressure fuel pump is driven.

Meanwhile, although the configuration in which the recovery port 23 is formed at the lateral side of the cover 24 is described in the present embodiment, the present invention is not necessarily limited thereto.

Embodiment 2

Figure 5:
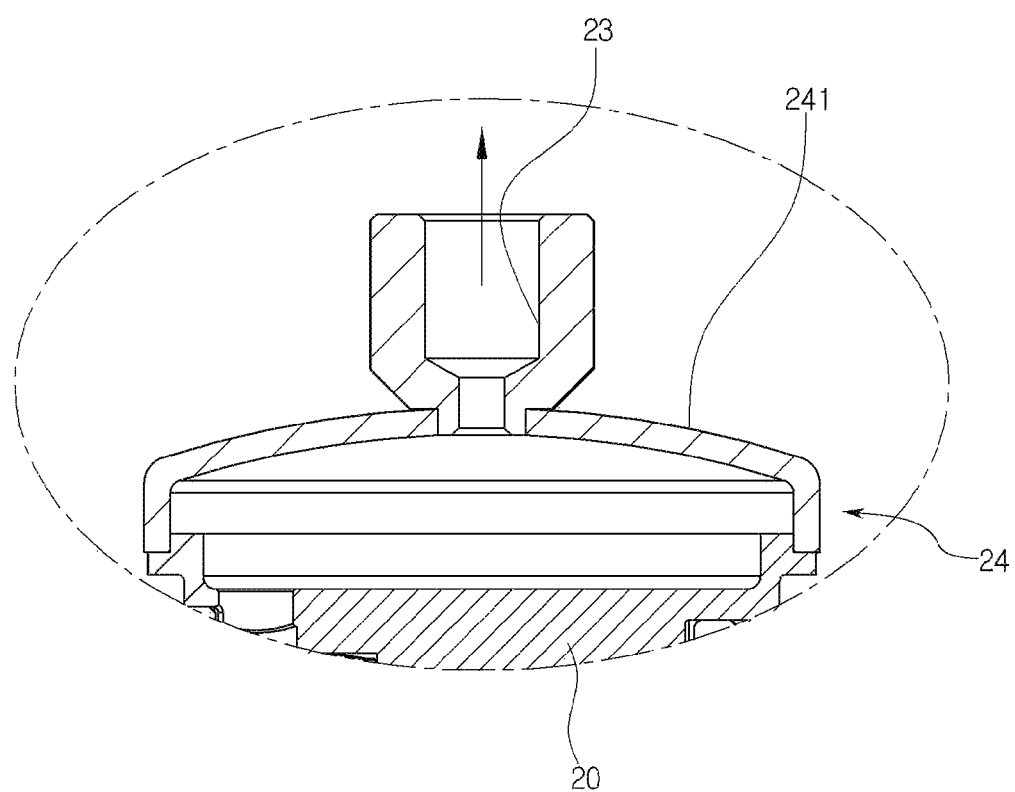
FIG. 5 is a partially enlarged sectional view of a high pressure fuel pump according to a second embodiment of the present invention.

FIG. 5 is a partially enlarged sectional view of the high pressure fuel pump according to a second embodiment of the present invention.

As shown in FIG. 5, the high pressure fuel pump 14 according to the second embodiment of the present invention may have a configuration similar to the configuration of the high pressure fuel pump 20 according to the first embodiment described with reference to FIGS. 2 to 4, except that the recovery port 23 is formed on the upper surface of the cover 24.

Therefore, the cover 24 may have a dome shape in which a central portion of the upper surface of the cover 24 formed with the recovery port 23 is convex upward, and the upper surface of the cover 24 may be formed as an inclined surface 241 inclined downward in the outward direction from the center thereof.

As described above, according to the present invention, the cover has a dome shape, which is convex upward, to collect gaseous fuel inside the cover and recover the collected gaseous fuel to the bombe when the engine is restarted so that the vapor may be completely removed, thereby improving restartability.

Meanwhile, although the first and second embodiments have been described with the configuration in which a damper portion for reducing pulsation of the fuel is omitted, the present invention may be modified such that the damper portion can be applied to the high pressure fuel pump 14.

Embodiment 3

Figure 6:
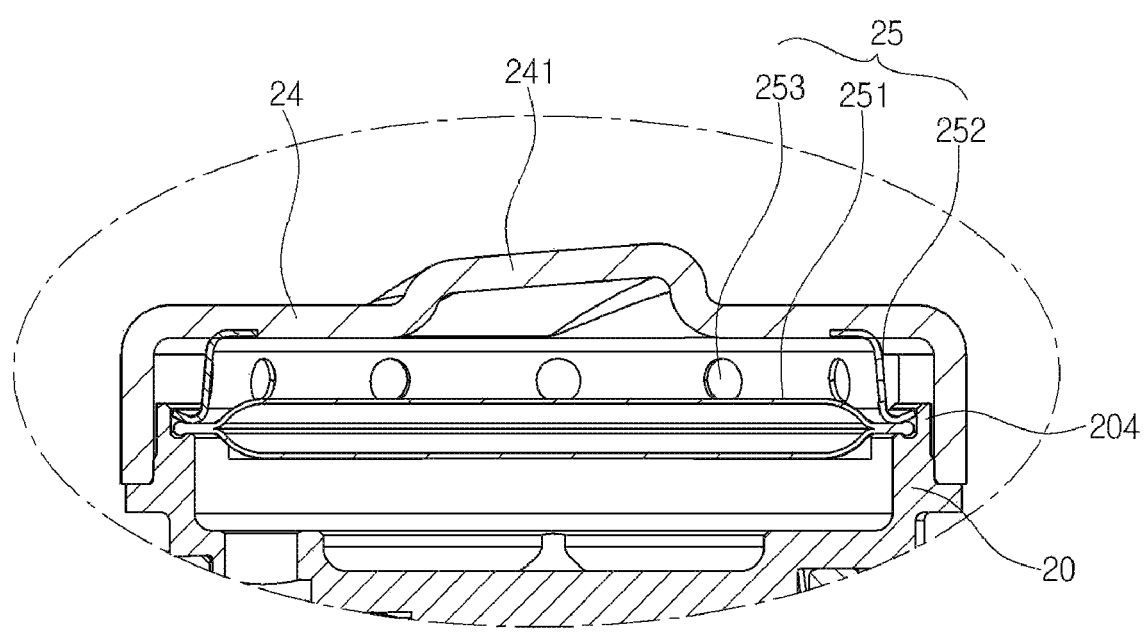
FIG. 6 is a sectional view showing a cover and a damper portion of a high pressure fuel pump according to a third embodiment of the present invention.
Figure 7:
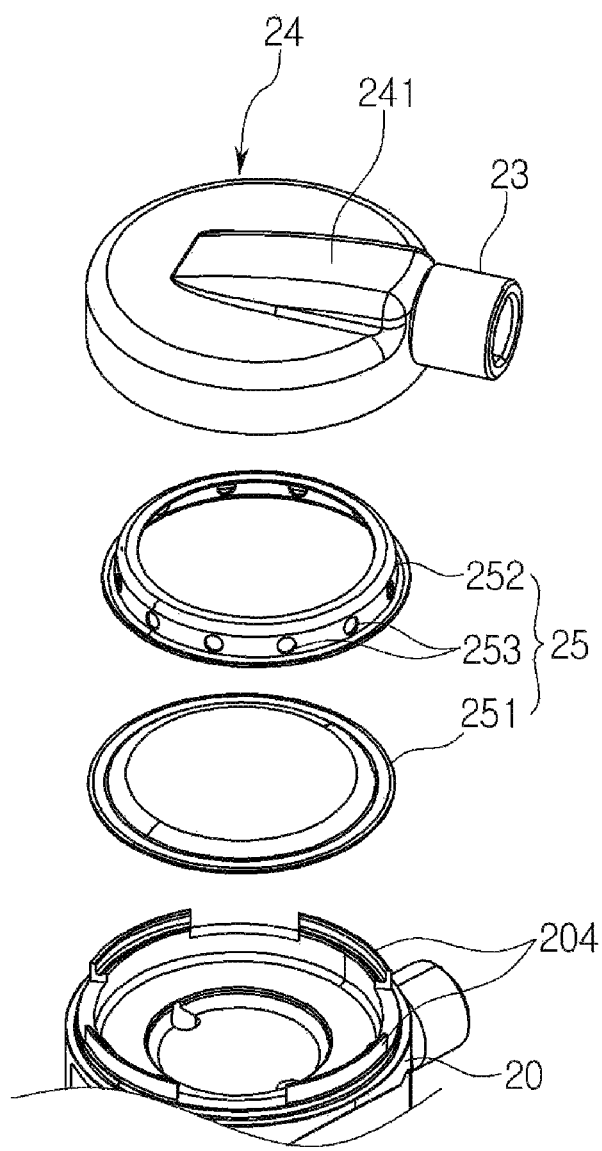
FIG. 7 is an exploded perspective view of a cover and a damper portion shown in FIG. 6.

FIG. 6 is a sectional view of a cover and a damper portion of a high pressure fuel pump according to the third embodiment of the present invention, and FIG. 7 is an exploded perspective view of the cover and the damper portion shown in FIG. 6.

As shown in FIGS. 6 and 7, the high pressure fuel pump 14 according to the third embodiment of the present invention may include a damper portion 25 coupled to an upper portion of a body 20 to reduce pulsation of the fuel.

The cover 24 may be formed in a cylindrical shape with a lower surface opened so that a space for installing the damper portion 25 may be provided in the cover 24, and an edge portion of the cover 24 may be coupled to a plurality of coupling ribs 204 provided at an upper surface of the body 20.

The damper portion 25 may include a damper 251 having a plurality of valleys formed on an outer surface of the damper portion 25 and an upper guide 252 coupled to an upper portion of the damper 251 to fix the damper 251 to an upper surface of the body.

A plurality of delivery holes 253 may be formed in the upper guide 252 to deliver the fuel of the low pressure portion 202 to the damper 251.

Flanges may be provided on outer peripheral surfaces of the damper 251 and the upper guide 252, respectively, and each flange may be press-fitted between the plurality of coupling ribs provided on the upper surface of the edge of the body 20.

Meanwhile, the cover 24 may have a dome shape in which a portion thereof is convex upward so as to collect gaseous fuel vaporized by heat of the engine.

That is, a portion of the upper surface of the cover 24 may be configured as an inclined surface 241 inclined downward in a direction opposite to the recovery port, and the gaseous fuel may be collected in an upper portion of an inner space of the cover 24 along the inclined surface 241.

As described above, when the damper portion is provided on the upper portion of the body, a portion of the upper surface of the cover may be configured as an inclined surface to collect the gaseous fuel, which is vaporized by the heat of the engine, in the cover, and the collected gaseous fuel may be recovered to the bombe when the engine is restarted, so that the vapor inside the high pressure fuel pump may be easily eliminated.

As mentioned above, although the invention made by the inventor(s) of the present invention has been specifically described, the present invention is not limited to the above embodiments and variously changes may be made without departing from the sprint of the present invention.

The present invention can be applied to the high pressure fuel pump, in which the cover has a dome shape to collect the gaseous fuel vaporized by the heat of the engine and the collected gaseous fuel is recovered to the bombe when the engine is restarted so that the vapor inside the high pressure fuel pump can be easily eliminated, and the LPDI system including the high pressure fuel pump.

What is claimed is:

1. A high pressure fuel pump comprising:
    a body formed at a lateral side thereof with an intake port and an exhaust port, and provided therein with a pressing device configured to press a portion of fuel, which is supplied through the intake port, at a pressure;
    a spill valve coupled to one side of the body to control a supply flow rate and exhaust pressure of the fuel; and
    a cover coupled to an upper portion of the body and having a recovery port for recovering a portion of the fuel supplied into the body to a bombe,
    wherein the cover collects gaseous fuel vaporized by heat of an engine when the engine is turned off after driving, and has a dome shape which is convex upward to recover the gaseous fuel to the bombe when the engine is restarted.

2. The high pressure fuel pump of claim 1, wherein an upper surface of the cover is configured as an inclined surface inclined to one side, and the gaseous fuel in an inner space of the cover is moved along the inclined surface and collected in an upper portion of the inner space of the cover.

3. The high pressure fuel pump of claim 2, wherein the upper surface of the cover is configured as an inclined surface inclined downward in a direction opposite to the recovery port when the recovery port is formed at a lateral side of the cover.

4. The high pressure fuel pump of claim 2, wherein the upper surface of the cover is configured as an inclined surface inclined downward in an outward direction from the recovery port when the recovery port is formed at the upper surface of the cover.

5. The high pressure fuel pump of claim 1, further comprising a damper portion provided at an upper portion of the body to reduce pulsation of the fuel,
   wherein the cover has a cylindrical shape with a lower surface opened to provide a space in which the damper portion is installed, and
   an inclined surface inclined downward in a direction opposite to the recovery port formed at a lateral side of the cover is formed on a portion of an upper surface of the cover.

6. The high pressure fuel pump of claim 1, wherein the spill valve includes:
   a core through which a magnetic flux flows;
   a sleeve coupled to one side of the core;
   a casing coupled to one side of the sleeve;
   a plunger configured to reciprocate a needle by power applied from an inside of the casing;
   a spring configured to apply restoring force to the needle; and
   a bobbin installed outside the core, in which a coil is wound on an outer peripheral surface of the bobbin,
   wherein an outer surface of the plunger is coated with a coating material to prevent the plunger from being worn during a reciprocating motion.

7. A liquid petroleum direct injection system including the high pressure fuel pump according to claim 1, the liquid petroleum direct injection system comprising:
   a fuel pump configured to pump the fuel stored in the bombe to supply the fuel toward the engine;
   the high pressure fuel pump configured to receive the fuel supplied from the fuel pump through the intake port formed in the body, press a portion of the fuel at high pressure in a high pressure portion formed inside the body, and transfer the fuel that remains after the fuel is pressurized to a fuel recovery line through the recovery port communicating with a low pressure portion such that the remaining fuel is recovered to the bombe;
   a delivery pipe connected to the exhaust port of the high pressure fuel pump through which the pressurized fuel is exhausted and filled with the pressurized fuel;
   an injector configured to directly inject the fuel filled in the delivery pipe into a combustion chamber of the engine;
   an electronic control unit configured to generate control signals for controlling a motor in the fuel pump, the injector, and a valve of the high pressure fuel pump based on a target rpm of the engine; and
   a motor controller configured to control a driving of the motor in accordance with the control signals
   wherein the cover of the high pressure fuel pump collects gaseous fuel vaporized by heat of the engine when the engine is turned off after driving, and has a dome shape which is convex upward to recover the gaseous fuel to the bombe when the engine is restarted.

* * * * *